(12) United States Patent
Jurgess

(10) Patent No.: US 11,504,894 B2
(45) Date of Patent: Nov. 22, 2022

(54) CONCORDANT STEP REGISTER

(71) Applicant: Gemini Group, Inc., Bad Axe, MI (US)

(72) Inventor: Jason Jurgess, Bad Axe, MI (US)

(73) Assignee: Gemini Group, Inc., Bad Axe, MI (US)

( * ) Notice: Subject to any disclaimer, the term of this patent is extended or adjusted under 35 U.S.C. 154(b) by 292 days.

(21) Appl. No.: 16/656,669

(22) Filed: Oct. 18, 2019

(65) Prior Publication Data

US 2020/0122379 A1 Apr. 23, 2020

Related U.S. Application Data

(60) Provisional application No. 62/747,860, filed on Oct. 19, 2018.

(51) Int. Cl.
*B29C 48/30* (2019.01)

(52) U.S. Cl.
CPC ........ *B29C 48/304* (2019.02); *B29C 48/3001* (2019.02)

(58) Field of Classification Search
CPC .......................... B29C 48/304; B29C 48/3001
See application file for complete search history.

(56) References Cited

U.S. PATENT DOCUMENTS

| | | | | |
|---|---|---|---|---|
| 3,856,446 A | * | 12/1974 | Schultz | B29C 48/09 425/113 |
| 2006/0172028 A1 | * | 8/2006 | Arruda | B29C 48/325 425/182 |
| 2010/0143520 A1 | * | 6/2010 | Pinchot | B29C 48/92 425/142 |
| 2013/0084349 A1 | * | 4/2013 | Walker | B30B 11/202 425/331 |
| 2019/0291325 A1 | * | 9/2019 | Thiede | B29C 48/325 |

* cited by examiner

*Primary Examiner* — Galen H Hauth
(74) *Attorney, Agent, or Firm* — Fishman Stewart PLLC

(57) ABSTRACT

An extrusion die may include a first die component and a second die component configured to mate with one another. The first die component may have a first body with a rim extending axially therefrom and at least one first channel through which a material is flowable, where the rim may define a recess. The second die component may have a second body with a platform extending axially therefrom and at least one second channel through which the material is flowable. The recess of the first die component may be configured to receive the platform. The rim of the first die component may include at least one protrusion extending radially into the recess, and the platform may include at least one notch complementary to the at least one protrusion to form a concordant step register for positioning the first die component and the second die component with respect to each other.

9 Claims, 4 Drawing Sheets

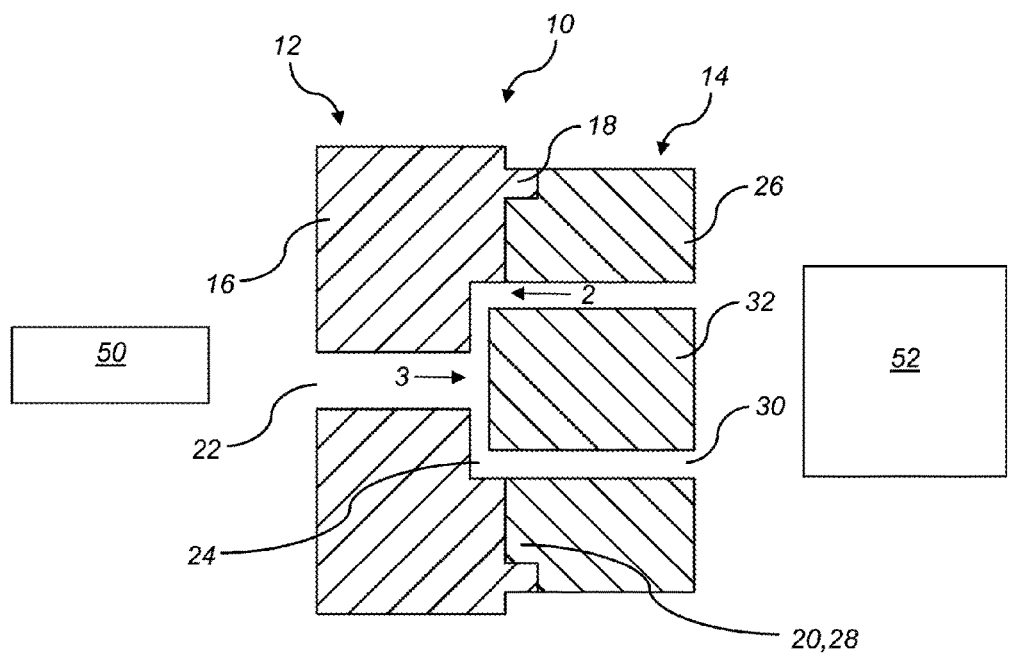
FIG. 1
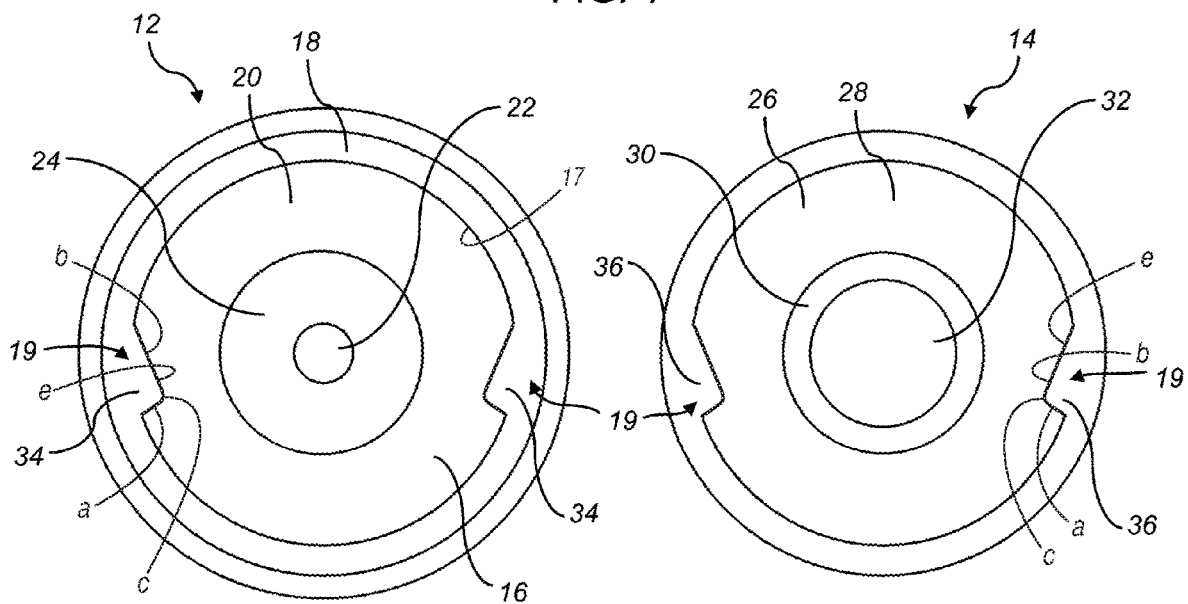
FIG. 2
FIG. 3

CONCORDANT STEP REGISTER

CROSS-REFERENCE TO RELATED APPLICATIONS

This application claims priority to U.S. Provisional Patent Application No. 62/747,860, filed on Oct. 19, 2018, which is hereby incorporated by reference in its entirety.

FIELD OF TECHNOLOGY

The present disclosure pertains to a concordant step register for the use in manufacturing machinery, including, but not limited to, extrusion dies.

BACKGROUND

Extrusion dies, such as those used for extruding aluminum parts, generally may include multiple components assembled together during the extrusion process to define the shape of the extruded part. The components must be pieced together with the proper respective orientations in order for the part to have the correct shape. Currently, extrusion dies incorporate locating holes in one or more components, and complementary dowels, pins, or the like, in one or more other components. However, the locating holes generally require extra machining steps of drilling or otherwise producing the holes, and the dowels and parts are extra parts that complicate assembly of the extrusion die. Further, once the extrusion process is complete, disassembly of the extrusion die components is also complicated, often requiring workers to chisel or pry the components apart.

Accordingly, an improved extrusion die incorporating a concordant step register, a method of manufacturing said improved extrusion die, and a method of extruding a part via the improved extrusion die are presented to simplify manufacturing, assembly, and disassembly of extrusion dies, thereby reducing the costs of making extruded parts.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present disclosure. Further, the embodiments set forth herein are not intended to be exhaustive or otherwise limit or restrict the claims to the precise forms and configurations shown in the drawings and disclosed in the following detailed description.

FIG. 1 is a schematic cross-sectional view of an extrusion die according to one exemplary approach;

FIG. 2 is a schematic front view of an exemplary first die component of the extrusion die of FIG. 1, taken from the perspective of arrow 2 in FIG. 1;

FIG. 3 is a schematic front view of an exemplary second die component of the extrusion die of FIG. 1, taken from the perspective of arrow 3 in FIG. 1;

DETAILED DESCRIPTION

An extrusion die may include a first die component and a second die component configured to mate with one another. The first die component may have a first body with a rim extending axially therefrom and at least one first channel through which a material is flowable, where the rim may define a recess. The second die component may have a second body with a platform extending axially therefrom and at least one second channel through which the material is flowable. The recess of the first die component may be configured to receive the platform. The rim of the first die component may include at least one protrusion extending radially into the recess, and the platform may include at least one notch complementary to the at least one protrusion to form a concordant step register for positioning the first die component and the second die component with respect to each other. Alternatively or additionally, the platform may include at least one protrusion extending radially outward therefrom, and the rim may include at least one complementary notch to form the concordant step register. The concordant step register may eliminate or reduce the number of locating holes and corresponding dowels/pins traditionally used to locate the first die component and second die component, which would ease manufacturing the die components, assembling, and disassembling the die components.

Referring to the figures, FIG. 1 depicts an exemplary extrusion die 10. The extrusion die 10 generally may include a first die component 12, which may be, but is not limited to, a die body, and a second die component 14, which may be, but is not limited to, a die plate. It should be appreciated that the extrusion die 10 may include more components, including, but not limited to, an adapter plate, a transition plate, and the like. As described in more detail below, the first die component 12 and the second die component 14 may be configured to removably mate with each other. The die 10 does not require dowels and pins to aid in the alignment and assembly of the two components 12 and 14.

Figure 4:
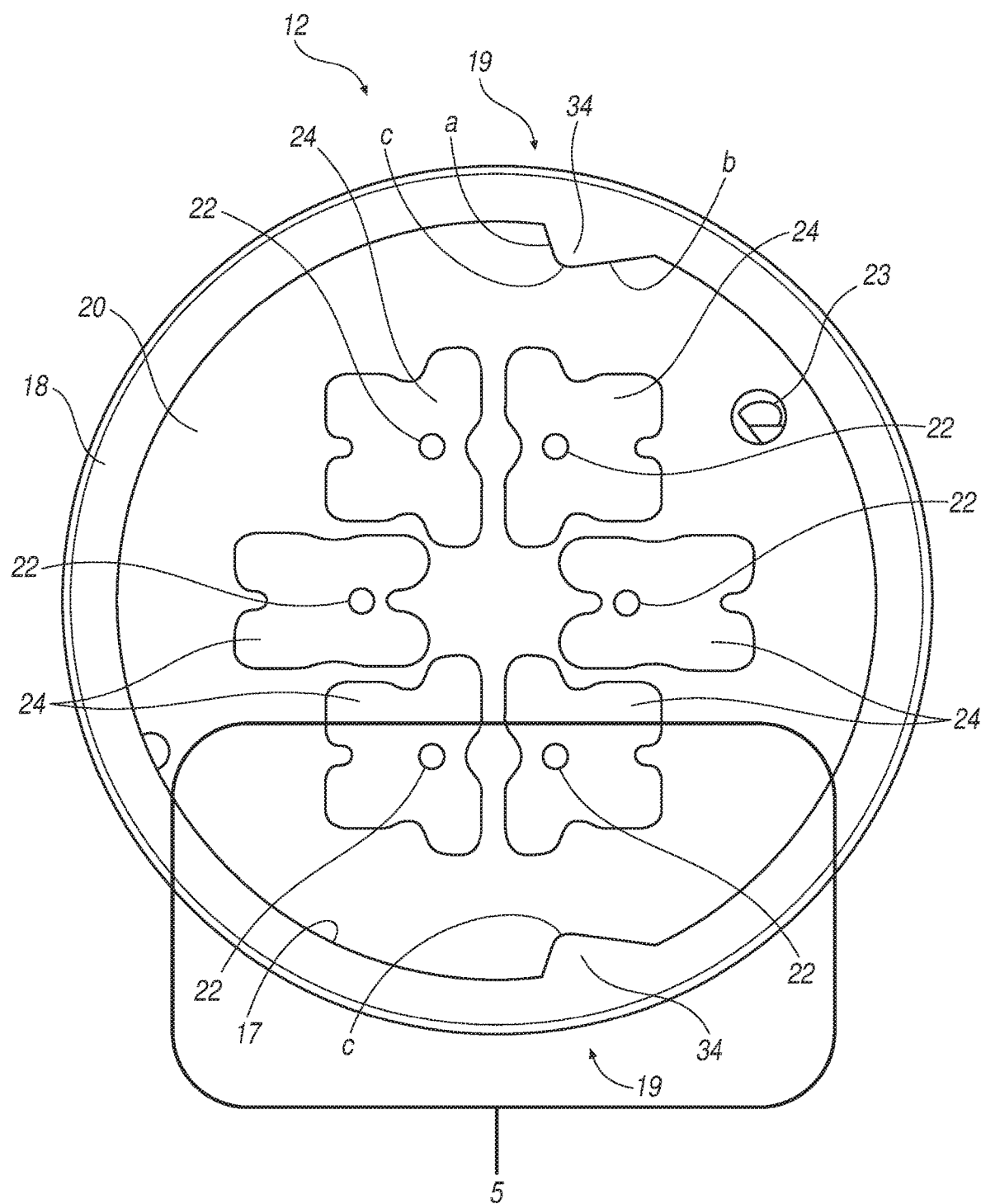
FIG. 4 is an illustration of another exemplary first die component.
Figure 5:
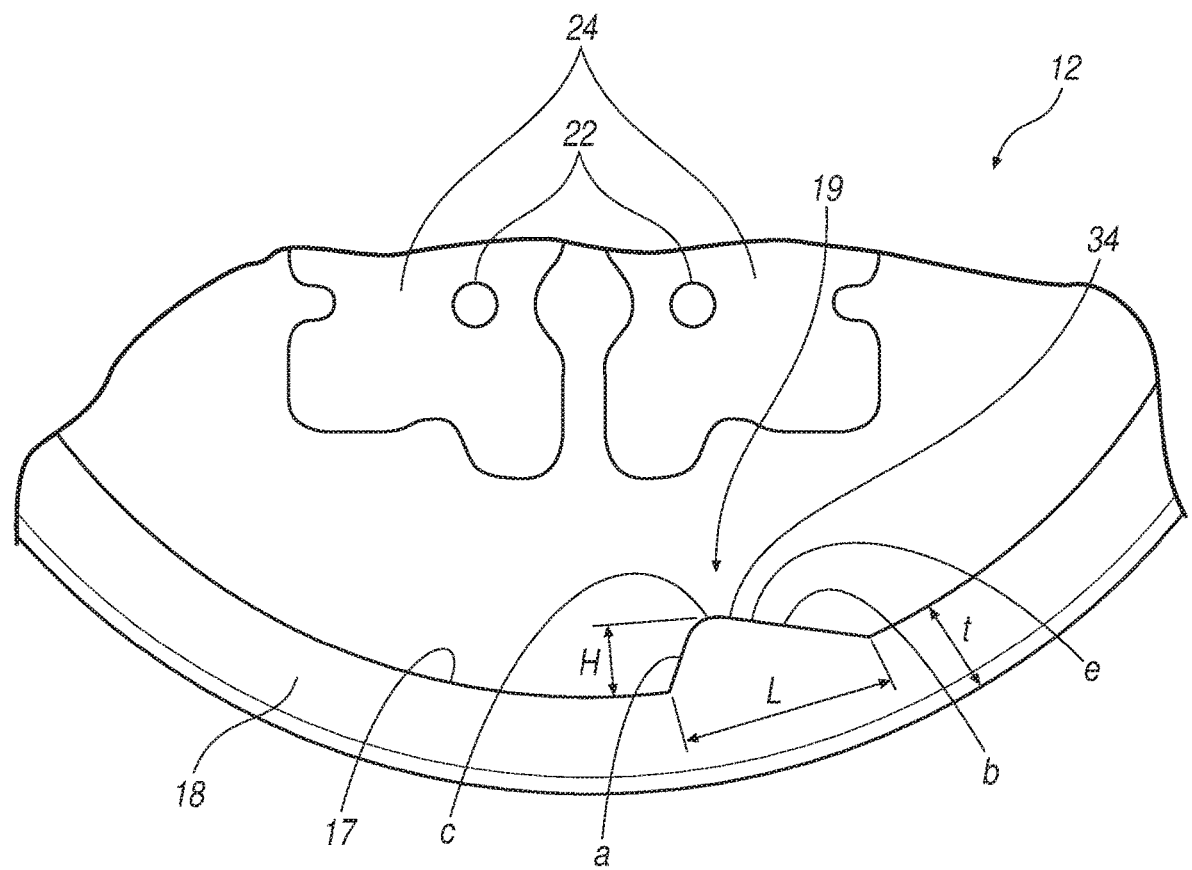
FIG. 5 is an enlarged illustration of the exemplary first die component of FIG. 4.

The first die component 12, illustrated in FIG. 2, may have a first body 16 with a rim 18 extending axially therefrom and defining a recess 20 radially interiorly of the rim 18. The first die component 12 may further include at least one first channel 22 in the first body 16 through which an extrusion material, and at least one depression 24. The first channel 22 and the depression 24 may be any shape, which generally may be dependent upon the desired configuration of the extruded part. While FIGS. 1 and 2 illustrate one channel 22 and one depression 24, it should be appreciated that there may be any number of each, again, dependent upon the desired configuration of the extruded part, as illustrated in FIGS. 4 and 5. The first body 16 may further include one or more vent holes 23 for venting of heat during the extrusion process.

The second die component 14, illustrated in FIG. 3, may have a second body 26 with a platform 28 extending axially therefrom. The recess 20 of the first die component 12 generally may be configured to receive the platform 28 to form the assembled extrusion die 10. The second die component 14 may also include at least one second channel 30 in the second body 26 through which the extruded material may be flowable. The second channel 30 may be in fluid communication with the first channel 22 such that the material may flow from the first die component 12 to the second die component 14. The second die component 14 may further include at least one structure 32 at least partially disposed within the channel 30 and extending axially. The structure 32 may or may not extend at least partially in the depression 24 of the first die component 12, and generally may allow for the extruded part to be have a hollow configuration. It will be appreciated that the structure 32 is shown having a generally rectangular shape so as to create a corresponding rectangularly shaped hollow configuration. However, the structure 32 may be made of a different shape so as to provide a resulting hollow configuration of another shape. The second channel 30 and the structure 32 may be any shape and/or configuration, dependent upon the desired configuration of the extruded part. While FIGS. 1 and 3 illustrate one channel 30 and one structure 32, it should be appreciated that there may be any number of each, which may or may not be the same, again, dependent upon the desired configuration of the extruded part. The second body 26 may further include vent holes in lieu of or in addition to the vent holes 23 in the first body 16.

FIGS. 1 and 2 depict an example of a die, an extrusion die in particular, for making an aluminum extruded part having a circular configuration that exits the die from channel 22. FIGS. 4-5 illustrate an alternative die, where the first die component 12 has multiple cavities or depressions 24 where multiple parts can be extruded per cycle. Here 6 different depressions 24 are presented. Each depression 24 has a first channel 22 for providing a passageway for material to be delivered to the corresponding depression 24. Thus, a die 10 is presented that has a first die component 12 and corresponding second die component 14 (not shown in FIG. 4) that allows for a plurality of parts to be extruded from a single die. The multi-cavity die 10 shown in FIG. 4 uses the step register 19. It will be appreciated that more or fewer depressions 24 are contemplated. FIG. 5 illustrates the die component 12 of FIG. 4, but here a lower section of the die 12 is shown enlarged so that the features of the step register 19 can be seen more clearly.

To aid in locating the first die component 12 and the second die component 14 with respect to each other for assembly into the extrusion die 10, the first die component 12 and the second die component 12 may collectively include a concordant step register 19. See FIGS. 2-4. In one exemplary approach, the rim 18 of the first die component 12 may include at least one protrusion 34, which may be, but is not limited to, a dog-ear shaped member, projection or protrusion, that extends radially inward from the rim 18 into the recess 20. The protrusion 34 may be a contiguous integral feature that extends from the rim, or it may be a separate component that is positioned adjacent or proximate to the rim 18. The protrusion 34 may flow smoothly from an interior surface or diameter 17 of the rim 18. The protrusion 34 may extend radially inward from the interior surface 17 in a direction towards the first channel 22 and/or the center of the die 12. As illustrated in FIGS. 2-4, there may be two protrusions 34 that may be arranged substantially diametrically opposed from each other and/or substantially symmetrical to one another. Alternatively, a protrusion 34 may be located at another portion about the circumference of the diameter 17. It should be appreciated that there may be any number of protrusions 34. Thus, one, two or more protrusions 34 may be contemplated. It will also be appreciated that the shape of the protrusion 34 may be the same, as illustrated, or they can be of a varied geometric configuration. For example, one protrusion 34 could be dog-ear shaped, as is shown in FIGS. 2 and 3, while the other protrusion 34 could be of a different geometric configuration such as star, conic, concave, convex, square, or triangle, just to name a few (not shown).

The second die component 14 may include at least one recess or notch 36 in the platform 28 that corresponds to one of the protrusions 34 of the first die component 12. The number of notches 36 generally may be the same as the number of protrusions, as illustrated in FIG. 3. Alternatively or additionally, the platform 28 may include at least one protrusion extending radially outward therefrom, and the rim 18 may include at least one complementary notch to form the concordant step register 19. It will be appreciated that the notches 36 and the protrusions 34 will mate with one another. For example, the protrusion 34 may be dog-eared shape, and the notch 36 likewise will be dog-eared shape to have a matching configuration to aid in the alignment process of the die components 12 and 14. Such arrangement avoids the need for costly dowels, bored holes, and extra parts that complicate assembly of traditional extrusion dies.

In one exemplary approach, the protrusions 34 may be generally dog-eared or triangular in shape. As seen in FIGS. 2-4, the triangular shaped protrusion 34 may have a smooth, rounded corner C to help ease the engagement with the protrusion 34 into the notch 36 during the assembly process. Further the edge e of the protrusion 34 has linear portions a and b that may be chamfered, smoothed or otherwise rounded in order to aid in the die assembly process. The protrusion 34 may further have a height H (or radial distance into the recess 20) and a length or arc length L. The length L may be greater than the height H. The height H further may be less than a thickness t of the rim 18, and the length L may be greater than the thickness t. It should be appreciated that the protrusion 34 may have other shapes and/or dimensions, which may or may not be the same as each other. Further, the notches 36 may or may not have substantially the same shape and/or dimensions as the corresponding protrusion 34.

Generally, the concordant step register 19 is a self-aligning mechanism that is, in part, the protrusion(s) 34 mating with the notch(es) 36. They may work in concert to lock the first die component 12 and the second die component 14 relative to one another, acting as somewhat of an anti-rotational feature. The concordant step register 19 may eliminate or reduce the number of locating holes and corresponding dowels/pins traditionally used to locate the first die component and second die component, which would ease manufacturing the die components, assembling, and disassembling the die components.

Figure 6:
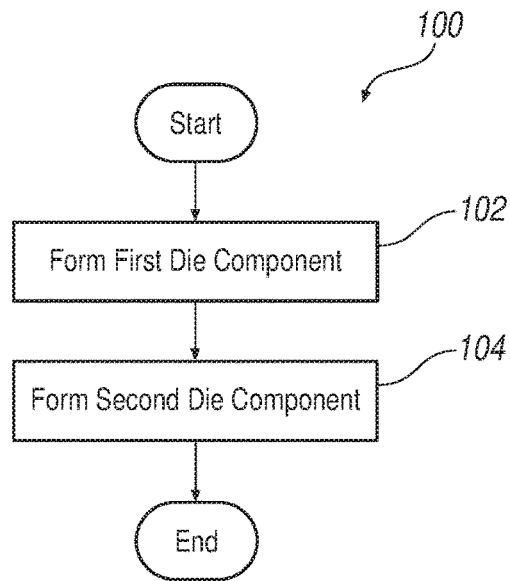
FIG. 6 is a schematic flow diagram of an exemplary method for manufacturing an extrusion die.

Referring now to FIG. 6, an exemplary process 100 for manufacturing an extrusion die 10 having a concordant step register 19 is shown. Process 100 may begin at step 102 in which a first die component 12 may be formed. As explained above, the first die component 12 may have a first body 16 with a rim 18 extending axially therefrom and defining a recess 20. The rim 18 may have at least one protrusion 34 extending radially into the recess 20. Alternatively or additionally, the rim 18 may be formed with at least one notch 36 therein. After step 102, process 100 may proceed to step 104 in which a second die component 14 may be formed. As explained above, the second die component 14 may have a second body 26 with a platform 28 extending axially therefrom. The platform 28 may include at least one notch 36 complimentary to the at least one protrusion 34 of the rim 18 of the first die component 12. Alternatively or additionally, the platform 28 may be formed with at least one protrusion 34 extending radially therefrom complementary to the at least one notch 36 in the rim of the first die component 12. The forming of the first die component 12 and the second die component 14, including forming the protrusions 34 and/or notches 36, may be performed, for example, by CNC machining. It should be appreciated that steps 102 and 104 may be interchangeably performed or may be performed simultaneously.

The method of assembling the first die component 12 and the second die component 14 includes providing the dies that have been manufactured in steps 102 and 104. Once completed, the first die component 12 may be positioned relative to the second die component 14. Next the two components 12 and 14 are aligned relative to one another such that the protrusion 34 is positioned into the notch 36 until the parts seat against one another tightly. The fit between protrusion 34 and notch 36 is a locking fit where the two components 12 and 14 cannot rotate but instead they are now unitary. Clamps 50 and 52 may now exert pressure and hold the die components 12 and 14 relative to one another. The extruding process may now begin. To disassemble the die 10, the clamps 50 and 52 are released, thus allowing the die components 12 and 14 to be pulled apart or otherwise disassembled.

Figure 7:
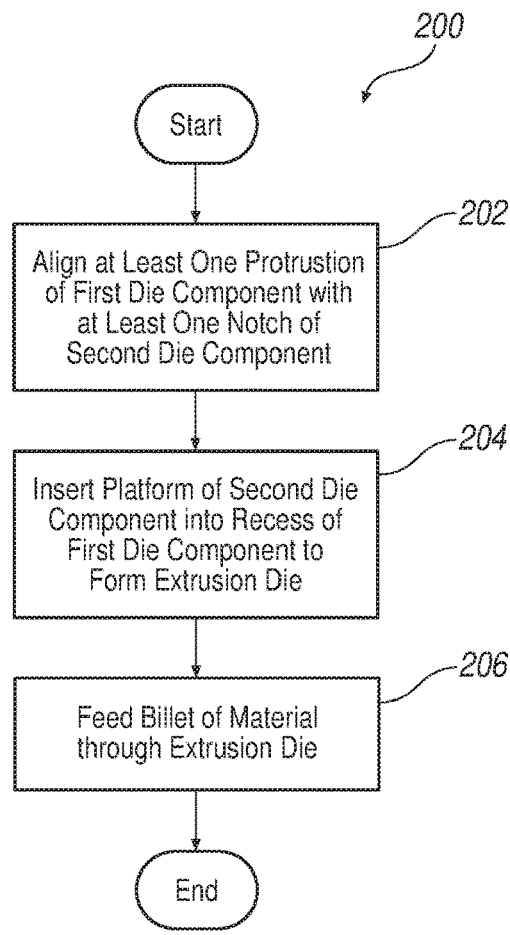
FIG. 7 is a schematic flow diagram of an exemplary method for extruding a part.

Referring now to FIG. 7, an exemplary process 200 for extruding a part is shown. While process 200 is described hereinafter with respect to extrusion die 10, it should be appreciated that process 200 may be performed via any extrusion die or other component, machine, or the like capable of performing the steps of process 200. Process 200 may begin at step 202 in which a first a first die component 12 may be aligned with a second die component 14. This may be achieved by aligning a protrusion 34 on at least one of the first die component 12 with a corresponding notch 36 on the second die component 14. After step 202, process 200 may proceed to step 204 in which a platform 28 of the second die component 14 is received in a recess 20 of the first die component 12, thereby forming the extrusion die 10. After step 204, process 200 may proceed to step 206 in which a billet of material may be fed through the extrusion die 10. The material may be a metal, including, but not limited to, aluminum, copper, magnesium, zinc, tin, carbon steel, titanium, or the like. The process 200 manufactures an extruded part as a result of the concordant step register 19 having aligned the die components 12 and 14 without the use of dowels and pins.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. An extrusion die comprising:
a first die component and a second die component configured to mate with one another;
wherein the first die component includes a first body with a rim extending axially therefrom and a plurality of first channels through which a material is flowable, the rim defining a recess;
wherein the second die component includes a second body with a platform extending axially therefrom and a plurality of second channels through which the material is flowable, the recess of the first die component being configured to receive the platform;
wherein the first body of the first die component and the second body of the second die component each include a first end, a second end spaced apart from the first end, and a cylindrical side surface extending between the first and second ends;
wherein the first channels extend from the first end to the second end of the first body and the second channels extend from the first end to the second end of the second body;
wherein the first end of the second body abuts the second end of the first body such that each of the first channels are in fluid communication with a corresponding one of the second channels;
wherein the first body includes a plurality of depressions each including a first channel of the plurality of first channels, the depressions are configured such that a respective part is extruded through each of the depressions, and the second body includes a plurality of interior structures each at least partially disposed in a second channel of the plurality of second channels; and
wherein at least one of:
the rim of the first die component includes at least one protrusion extending radially into the recess, and the platform of the second die component includes at least one notch complementary to the at least one protrusion to form a concordant step register for positioning the first die component and the second die component with respect to each other; and
the platform of the second die component includes at least one protrusion extending radially outward therefrom, and the rim of the first die component includes at least one notch complementary to the at least one protrusion to form the concordant step register.

2. The extrusion die of claim 1, wherein the at least one protrusion includes two protrusions, and the at least one notch includes two notches each complementary to a respective one of the two protrusions.

3. The extrusion die of claim 2, wherein the two protrusions are arranged substantially diametrically opposed from one another.

4. The extrusion die of claim 2, wherein the two protrusions are substantially symmetrical to one another.

5. The extrusion die of claim 1, wherein the at least one protrusion and the at least one notch have substantially the same shape; and the at least one notch extends along only a portion of the second body.

6. The extrusion die of claim 1, wherein at least one of the at least one protrusion and the at least one notch has a substantially triangular shape; and
a triangular shaped protrusion includes a rounded corner configured to ease an engagement of the first and second die components during an assembly process.

7. An extrusion die comprising:
a first die component and a second die component configured to mate with one another;
wherein the first die component includes a first body with a rim extending axially therefrom and at least one first channel through which a material is flowable, the rim defining a recess;
wherein the second die component includes a second body with a platform extending axially therefrom and at least one second channel through which the material is flowable, the recess of the first die component being configured to receive the platform;
wherein the first body of the first die component and the second body of the second die component each include a first end, a second end spaced apart from the first end, and a cylindrical side surface extending between the first and second ends;
wherein the at least one first channel extends from the first end to the second end of the first body and the at least one second channel extends from the first end to the second end of the second body;
wherein the first end of the second body abuts the second end of the first body such that the at least one first channel is in fluid communication with the at least one second channel;
wherein at least one of:
the rim of the first die component includes at least one protrusion extending radially into the recess, and the platform of the second die component includes at least one notch complementary to the at least one protrusion to form a concordant step register for positioning the first die component and the second die component with respect to each other; and
the platform of the second die component includes at least one protrusion extending radially outward therefrom, and the rim of the first die component includes at least one notch complementary to the at least one protrusion to form the concordant step register; and
wherein at least one protrusion is dog-eared shaped.

8. An extrusion die comprising:
a first die component and a second die component configured to mate with one another;
wherein the first die component includes a first body with a rim extending axially therefrom and at least one first channel through which a material is flowable, the rim defining a recess;
wherein the second die component includes a second body with a platform extending axially therefrom and at least one second channel through which the material is flowable, the recess of the first die component being configured to receive the platform;
wherein the first body of the first die component and the second body of the second die component each include a first end, a second end spaced apart from the first end, and a cylindrical side surface extending between the first and second ends;
wherein the at least one first channel extends from the first end to the second end of the first body and the at least one second channel extends from the first end to the second end of the second body;
wherein the first end of the second body abuts the second end of the first body such that the at least one first channel is in fluid communication with the at least one second channel;
wherein at least one of:
the rim of the first die component includes at least one protrusion extending radially into the recess, and the platform of the second die component includes at least one notch complementary to the at least one protrusion to form a concordant step register for positioning the first die component and the second die component with respect to each other; and
the platform of the second die component includes at least one protrusion extending radially outward therefrom, and the rim of the first die component includes at least one notch complementary to the at least one protrusion to form the concordant step register; and
wherein the at least one protrusion has a first side defined by a length, and a second side that is defined by a height, the length is greater than the height, the height is less than a thickness of the rim of the first die component; and the length is greater than the thickness.

9. An extrusion die comprising:
a first die component and a second die component configured to mate with one another;
wherein the first die component includes a first body with a rim extending axially therefrom and at least one first channel through which a material is flowable, the rim defining a recess;
wherein the second die component includes a second body with a platform extending axially therefrom and at least one second channel through which the material is flowable, the recess of the first die component being configured to receive the platform;
wherein the first body of the first die component and the second body of the second die component each include a first end, a second end spaced apart from the first end, and a cylindrical side surface extending between the first and second ends;
wherein the at least one first channel extends from the first end to the second end of the first body and the at least one second channel extends from the first end to the second end of the second body;
wherein the first end of the second body abuts the second end of the first body such that the at least one first channel is in fluid communication with the at least one second channel;
wherein at least one of:
the rim of the first die component includes at least one protrusion extending radially into the recess, and the platform of the second die component includes at least one notch complementary to the at least one protrusion to form a concordant step register for positioning the first die component and the second die component with respect to each other; and
the platform of the second die component includes at least one protrusion extending radially outward therefrom, and the rim of the first die component includes at least one notch complementary to the at least one protrusion to form the concordant step register; and
wherein the first die component and the second die component are configured to be held together via opposing clamps, and the first body of the first die component includes one or more vent holes configured to vent heat that is generated during operation of the extrusion die.

\* \* \* \* \*